United States Patent [19]

Porel

[11] Patent Number: 4,492,013

[45] Date of Patent: Jan. 8, 1985

[54] METHOD FOR MANUFACTURING A PRESTRESSED HYDRAULIC ACCUMULATOR

[75] Inventor: Louis C. Porel, Rambervillers, France

[73] Assignee: Hydro Rene Leduc, Baccarat, France

[21] Appl. No.: 236,195

[22] Filed: Feb. 20, 1981

[30] Foreign Application Priority Data

Feb. 27, 1980 [FR] France ................................ 80 04313
Apr. 30, 1980 [FR] France ................................ 80 09781

[51] Int. Cl.³ .............................................. B23P 15/00

[52] U.S. Cl. .................................... 29/157 R; 29/446; 92/98 R; 138/30; 403/273; 403/300

[58] Field of Search ............. 29/157 R, 446; 92/98 R, 92/128; 138/30; 285/381; 403/273, 300

[56] References Cited

U.S. PATENT DOCUMENTS

| | | | |
|---|---|---|---|
| 2,563,257 | 8/1951 | Loukonen | 138/30 |
| 2,667,184 | 1/1954 | Hailer et al. | 92/98 R |
| 2,751,934 | 6/1956 | Saunders | 92/98 R |
| 3,094,074 | 6/1963 | Tuckey | 92/98 R |
| 3,179,054 | 4/1965 | Arndt et al. | 92/128 |
| 3,351,098 | 11/1967 | Freeman | 138/30 |
| 3,513,429 | 5/1970 | Helsop | 285/381 |
| 3,524,665 | 8/1970 | Hohn et al. | 403/273 |
| 3,587,395 | 6/1971 | Nisley et al. | 92/98 R |
| 4,191,485 | 3/1980 | Samurin et al. | 29/446 |
| 4,299,159 | 11/1981 | Förster | 92/98 R |

FOREIGN PATENT DOCUMENTS 2755457 6/1979 Fed. Rep. of Germany .

*Primary Examiner*—Daniel C. Crane
*Attorney, Agent, or Firm*—Darby & Darby

[57] ABSTRACT

A hydraulic accumulator comprises two-halfs shells, the diaphragm therebetween defining two cavities. One cavity contains presssurized gas and the cavity receives hydraulic fluid under pressure. The two-half shells are held together by a mechanical element, such as a belt which has been previously prestressed to a tension selected according to the maximum pressure to which the accumulator will be subjected. The use of the prestressed mechanical element changes the dynamic stresses ordinarily found in a hydraulic accumulator to static stresses, thus minimizing the occurrence of creeks and failure of the device.

5 Claims, 6 Drawing Figures

METHOD FOR MANUFACTURING A PRESTRESSED HYDRAULIC ACCUMULATOR

FIELD OF THE INVENTION

The present invention is relative to an oleo-pneumatic accumulator of the type formed of an enclosure and a gas-fluid separator. Generally, the enclosure is a metallic casing. The separator may be made of a flexible membrane.

Experience proves that accumulators, when they operate at a high pressure and at frequently repeated pressurization and depressurization cycles, quickly deteriorate due to metal fatigue. In the case of enclosures made of two portions screwed one into the other, it is at the bottom of the screw threads where the fatigue starts to appear. It is characterized by creeks which cause the breaking of the enclosure.

OBJECTS AND SUMMARY OF THE INVENTION

The object of the present invention is to transform the dynamic stresses to which is subjected the junction of the two enclosures, thereby causing metal fatigue, into a static stress, thereby removing the metal fatigue.

The invention relates to a manufacturing process of an oleo-pneumatic accumulator made of two shells assembled to each other, after the interposition of a flexible separating membrane, said process being characterized in that the mechanical element providing the connection between the two shells is subjected, before the assembly, to a prestress.

According to a first embodiment, the two shells are assembled to each other by means of an outer belt, previously set under tension; according to a second embodiment, the two shells are each provided with a skirt, one of them fitting into the other, and one of the skirts having been previously set under tension.

According to the present invention, and in one or the other of the hereabove embodiments, a cylindrical wedge can be interposed between the two shells so that, when the effort to which the accumulator is subjected is superior to that of the prestress, the shells draw apart, at least slightly, from said wedge, thereby causing a leakage flow.

Thus, this arrangement plays the part of an overpressure valve which provides a security preventing the accumulator from being subjected to a maximum predetermined pressure.

By providing one or several liquid discharge openings through the prestressed belt, the oil is allowed to be discharged, thereby making the leakage flow caused by an overpressure more visible.

The invention relates also to means for performing said process and also, as novel industrial products, accumulators to which said process has been applied.

BRIEF DESCRIPTION OF THE DRAWINGS

By way of a non limiting example and in order that the invention may become more apparent, reference is made to the accompanying drawings wherein.

DETAILED DESCRIPTION OF THE EMBODIMENTS

Figure 1:
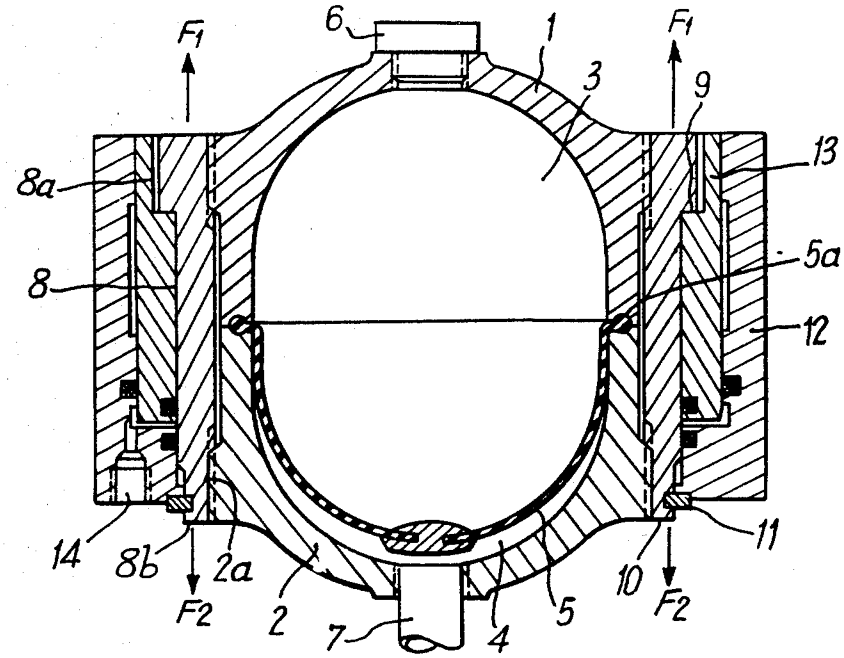
FIG. 1 is a schematic cross-sectional view of a first embodiment of the process.

Referring to FIG. 1, one sees that the accumulator is made, as is known, of two shells 1, 2 which, when assembled to each other, define an inner volume divided into two compartments 3 and 4 separated by a flexible membrane 5. The shell 1 is closed by a plug 6 and the shell 2 is connected to a hydraulic pipe 7. Through the plug 6, the volume 3 is filled with a pressurized gas; the volume 4 receives the hydraulic liquid from pipe 7. The flexible membrane 5 is provided on its edge with a bead 5*a* ensuring its fixation by being clamped between the two shells 1, 2.

In the known devices, the two shells 1 and 2 are screwed onto each other. However, it appears that when such accumulators are subjected to high and vigorously alternated pressures, creeks appear rather quickly in the metal in the bottoms of the screw threads, which can be the cause of breakings of the connection between the two shells.

When such accumulators are tested on fatigue benches where they are subjected to alternated pressures between the atmospheric pressure and their operational maximum pressure, creeks which lead very quickly to the breaking of the accumulator appear, and this after a short cycling period of the order of a few hundreds of thousands of cycles.

In order to avoid the formation of such creeks, the two shells 1 and 2 are, according to the process which is the object of the present invention, assembled with a prestress.

In the example shown in FIG. 1, the two shells 1 and 2 are not assembled by being screwed directly onto each other, but through the agency of a belt 8 which is subjected, before assembly, to an elongation tension by a force superior to the force generated by pressurizing the accumulator and superior to that of its maximum utilization pressure.

The belt 8 is formed with a threading 8*a* adapted for receiving the threading 1*a* of shell 1 and a threading 8*b* adapted for receiving the threading 2*a* of shell 2.

Moreover, the belt 8 is formed with an outer shoulder 9 and a groove 10 in which is engaged a ring 11. Between the two abutments formed by the shoulder 9 and the ring 11 are placed the two elements of a hydraulic jack formed by the body of the jack as such 12, bearing against the ring 11, and an annular piston 13 bearing against shoulder 9, parts 12 and 13 being concentric with belt 8.

When the accumulator is to be mounted, the annular piston 13 is first positioned around belt 8, then the jack body 12 and finally the ring 11. Hydraulic liquid under pressure is then introduced between the jack body 12 and the piston 13 via opening 14, so that the belt is subjected to an effort which tends to elongate it longitudinally in the opposite directions $F_1$ and $F_2$.

The lower shell 2 is then positioned by screwing its threading 2*a* in the inner threading 8*b* of belt 8; membrane 5 is put in place; and the shell 1 is screwed via its threading 1*a* on the other inner threading 8*a* of belt 8, until the two shells 1 and 2 come into a close fit against each other. The hydraulic pressure supplied at 14 is stopped, the ring 11 is withdrawn, followed by the jack body 12 and the piston 13.

Due to its elasticity proper, the belt 8 presses the two shells 1 and 2 against each other, the belt 8 providing a prestressed fixation.

Figure 2:
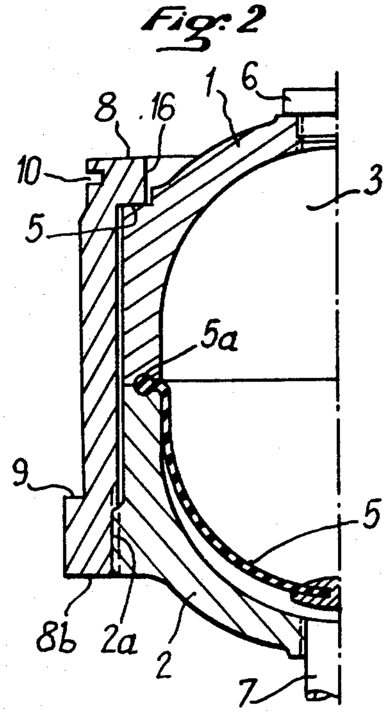
FIG. 2 is a schematic cross-sectional view illustrating an alternative embodiment different to that of FIG. 1.

In the alternative shown in FIG. 2 (where a half accumulator only is shown) the respective positions of shoulder 9 and of a groove 10, adapted for receiving the ring 11, are reversed, but their role is identical. The shell 2 alone is screwed on the belt 8, the shell 1 being simply maintained by the shoulder 15 which rests on the corresponding shoulder 16 provided inside the shell 8, instead of threading 1*a*.

In this case, the belt 8 is previously set under tension, by means of the same jack 12–13 (not shown) than that used for the device of FIG. 1; then the shell 1 is introduced from the bottom inside the belt 8 until the shoulders 15 and 16 engage each other; the membrane 5 is put in place; then the shell 2 is screwed via its threading 2*a* on the threading 8*b* of the belt until the shell 2 is in a close fit against shell 1; the pressure in jack 12–13 is released and the jack is removed as previously.

In both cases, the two shells 1 and 2 are kept tightly pressed against each other due the prestress created by belt 8.

Preferably, the previous extension force to which is subjected the belt 8 is determined so as to be higher than the extension force to which it will be subjected when the accumulator will be subjected to the maximum pressure on the testing bench, pressure which is in turn superior the maximum utilization pressure of the accumulator.

Figure 3:
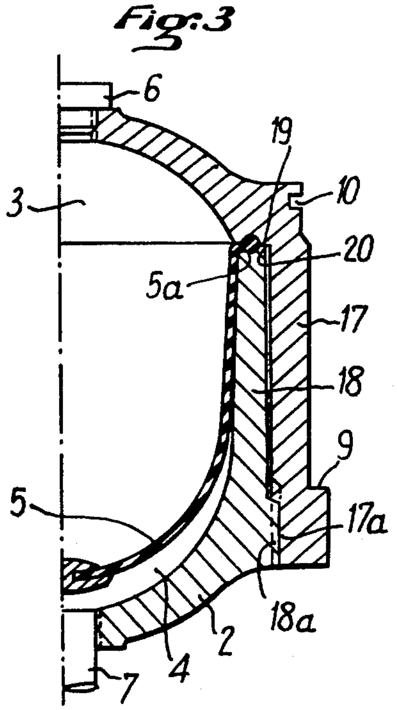
FIG. 3 is schematic cross-sectional view illustrating a second embodiment of the process.

In the example shown in FIG. 3, the belt 8 is integral with one of the shells, viz. shell 1 in the example shown.

In this example, the shell 1 is provided at its base with a skirt 17, of a length substantially equal to that of the belt 8 of FIGS. 1 and 2. Said skirt 17 is provided at its base with an inner threading 17*a*. At its upper end, the skirt 17 is formed with an inner shoulder 19, provided with a groove adapted for receiving the bead 5*a* of membrane 5. Similarly, the shell 2 is provide with a skirt 18 having practically the same length as skirt 17, but of smaller diameter so as to fit into the inside of said skirt 17. At its lower portion, the skirt 18 is formed with a threading 18*a* adapted for being screwed into the threading 17*a* and at its upper portion with a flat surface 20 which is provided for abutting against shoulder 19, and comprising also a groove for receiving the bead 5*a* of membrane 5.

As is the belt 8, the skirt 17 is formed with a shoulder 9 and a groove 10 adapted for receiving the ring 22, so that the jack 12–13 (not shown) may be positioned around the skirt 17, as it is positioned around the skirt 8.

The skirt 17 is previously set under tension by the jack 12–13, in a similar way as already described with refence to FIGS. 1 and 2, then the shell 2 is screwed onto shell 1 (with interposition of membrane 5) until they are in a tight fit relationship; the pressure in the jack 12–13 is then released and the jack is demounted.

The two shells are then maintained tightly pressed against each other, due to the prestress created in skirt 17.

With this process, an accumulator having the same capacity as a standard accumulator and subjected to the same trial pressure has withstood, without formation of creeks, 5 millions of cycles at the testing pressure, whereas the creeks appeared in the standard accumulator after only 150,000 cycles.

It is quite obvious that the length of the element set under tension previously to the assembly (viz. the belt 8 or the skirt 17) as well as its thickness are determined as a function of the intensity of the prestress effort which is desired.

It is also obvious that the invention is not limited to the particular embodiment of the jack 12–13 providing the pre-tensioning of the belt 8 or of the skirt 17.

Figure 5:
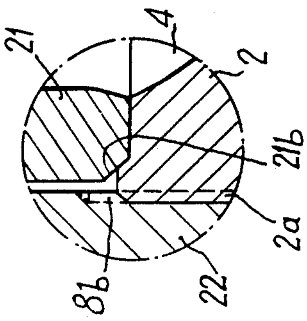
FIG. 5 is a view at a larger scale of a detail of FIG. 4.
Figure 4:
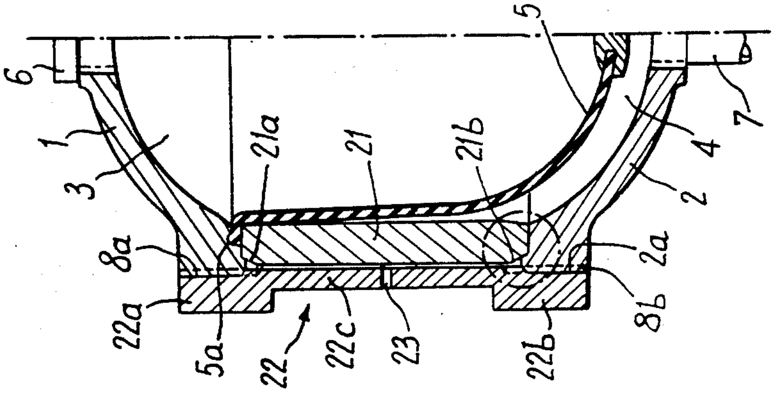
FIG. 4 is a half-sectional view of the embodiment of an accumulator provided with a wedge according to the invention.

Referring to FIGS. 4 and 5, one sees that it is possible, before assembling the two shells 1 and 2, to interpose between them a cylindrical wedge 21 which, in the example shown, is a hollow cylinder of revolution, or a portion of a tube.

At its lower and upper portions, this wedge is formed with a chamfer 21*a* and 21*b*, viz. two chamfers fitting into chamfers of corresponding shape provided in the edges of shells 1 and 2.

The membrane 5 is provided with a bead 5*a* which engages into the groove of mating shape formed in the edge of shell 1, so that the bead is clamped between the shell 1 and the wedge 21.

The lower face of wedge 21 is bearing by being in direct contact against the edge of shell 2.

The prestressed outer belt 22 comprises, as a test-bar, a central portion 22*c* of small cross-section and two ends 22*a* and 22*b* of larger cross-section in which are provided the threadings 8*a* and 8*b*.

For assembling the accumulator thus constructed, the lower shell 2 is screwed to the base of belt 22 by means of its threading 2*a* which engages the threading 8*b* of portion 22*b*; then the wedge 21 is put in position; followed by membrane 5. The belt 22 is next set under tension, either by means of the jack described in FIG. 1 of the main patent, or by means of the jack described hereafter, with reference to FIG. 6. When the determined pre-tension value is reached, the upper shell 1 is screwed in the belt 22 by means of its threading 1*a* which engages threading 8*a*; then the tension created by the jack is released and the jack is removed.

The two shells 1 and 2 are thus tightly pressed against each other by the tension previously created inside the structure of belt 22 to which its thinned median shape confers better elasticity characteristics. The membrane 5 is maintained by its bead 5*a* which is clamped between shell 1 and wedge 21.

The hydraulic liquid under high pressure flows in via pipe 7 and lifts up membrane 5 by compressing the gas which is in enclosure 3. This hydraulic pressure and the gas pressure (which is equal) tend to separate the shells 1 and 2 and the wedge 21; but these parts remain applied against each other as long as the force created by this pressure remains lower than the pre-tension force to which the belt 22 has been subjected.

When the pressure is in excess of the predetermined maximum value, the force which tends to separate parts 1, 2 and 21 becomes superior to that tending to maintain them tightly pressed against each other and the wedge 21 moves off shell 2, so that the liquid can leak out. The higher the difference between the admitted maximum pressure and the real pressure existing at 4, the more important is the gap between wedge 21 and shell 2, and therefore the leakage flow.

Therefore, the device plays the role of a safety device preventing the deterioration of the accumulator through an over-pressure.

The liquid which flows between wedge 21 and belt 22 is discharged through one or several openings 23 extending through the latter and which, moreover, allows detecting the existence of a leakage flow.

Figure 6:
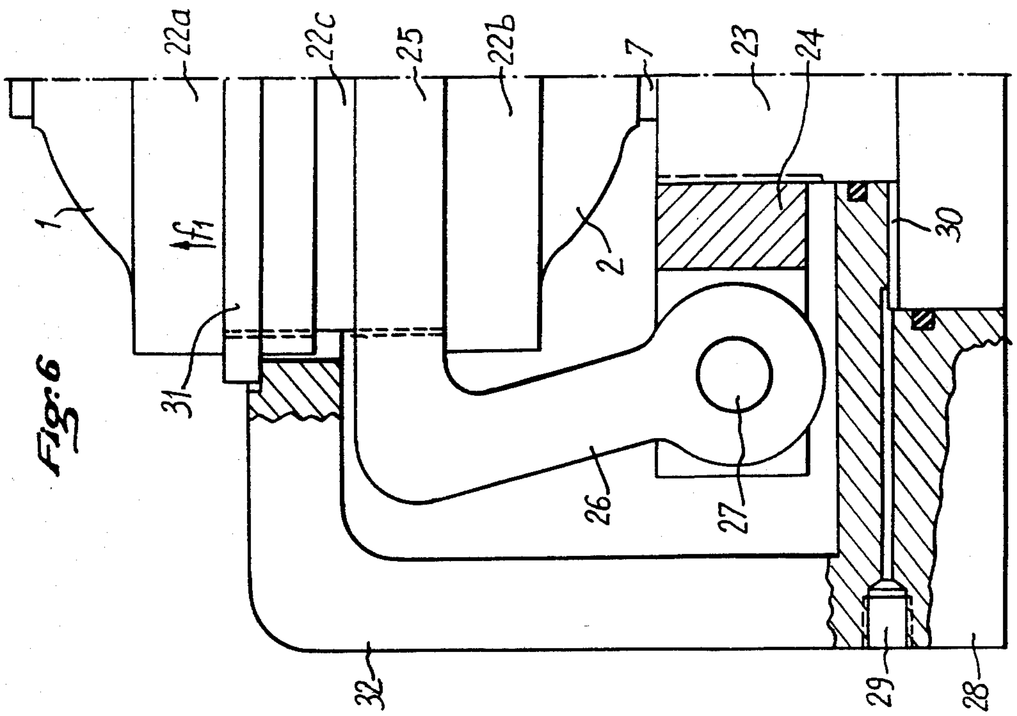
FIG. 6 shows an embodiment of a mechanism for applying the prestress to the belt shown in FIG. 4.

FIG. 6 shows the device for elongating the belt 22. On a stand 23 is screwed a crown 24 carrying to half-collars 25 through the agency of arms 16 articulated on axes 27 carried by the crown 24 (in FIG. 6 is shown only a half-collar 25, a single arm 26 and a single axis 27).

The lower portion of stand 24 forms a piston engaged into a jack body 28 formed with a channel 29 opening into a chamber 30. Said jack 28 carries two half-collars 31 through the agency of the two arms 32.

For mounting the accumulator, the lower shell 2 is placed on the stand, then the wedge 21 is put in position, followed by the membrane 20 and the belt 22 is screwed to the lower shell. The two arms 26 are then folded back so that the two half-collars 25 come to bear against the shoulder which separates the portions **22*c* and 22*b* of belt 22. The two half-collars 31 are put in position, said half-collars being formed with a shoulder which engages the ends of arms 32; the two half-collars 31 come to rest against the shoulder separating portions 22*c* and 22*b* of belt 22. The high pressure is admitted inside chamber 30, the effect of which is that the arms and the half-collars 31 are biased in the direction $f_1$ while the arms 22 and the half-collars 25 remain stationary: this causes an elongation of belt 22. The shell 1 is then screwed and the pressure in chamber 30** is released.

The present invention relates not only to a manufacturing process of a hydraulic accumulator, but also to the hydraulic accumulator thus obtained.

I claim:

1. A method for manufacturing an oleopneumatic accumulator of the type having a first shell having an open end forming a first chamber adapted to receive pressurized gas, and a second shell having an open end forming a second chamber adapted to receive a pressurized hydraulic fluid comprising the steps of:

disposing a flexible membrane between said open ends of said first and second chambers to form a fluid tight seal therewith;

engaging opposite ends of an annular elastic metal clamping band to tension said band in a direction along the longitudinal axis perpendicular to a diameter of said band, said tension being in a predetermined amount corresponding to a hydraulic pressure applied to said second chamber at which said first and second shells separate;

affixing said elastic clamping band to said first and second shells to overlie the edges of said open ends; and disengaging said opposite ends of said affixed clamping band, said affixed clamping band retaining at least a portion of said tension to clamp the shells together, said band stretching substantially only in the direction of its tension along said longitudinal axis when hydraulic fluid pressure in excess of said predetermined amount of tension is applied to said second chamber to permit said shells to separate.

2. The method according to claim 1 wherein:

said annular clamping band comprises a belt;

said direction of stress is longitudinal to said belt; and said shells are assembled to one another by being screwed to threads inside said belts.

3. The method according to claim 1 wherein:

said first and second shells each include a skirt, said method further including the step of:

placing one of said skirts under tension; and screwing said skirts into one another, whereby said tension draws said first and second shells together.

4. The process according to any of claims 1, 2 or 3, wherein the step of setting said annular clamping band under tension is carried out by a hydraulic jack dipsosed coaxially around the part to be set under tension.

5. The method according to claim 1, 2 or 3 further including the steps of:

interposing a cylindrical wedge between said first and second shells, said tensioned annular clamping band maintaining said first and second shells and said wedge pressed against each other, said wedge permitting leakage of hydraulic fluid when said force due to applied hydraulic pressure exceeds the tension of said annular clamping band.

* * * * *